United States Patent
Seifer et al.

(10) Patent No.: US 10,629,061 B2
(45) Date of Patent: Apr. 21, 2020

(54) WIRELESS PEST MANAGEMENT SYSTEM AND METHOD

(71) Applicant: IoT Box Systems LTD., Moshav Hadid (IL)

(72) Inventors: Shmuel Seifer, Ramat Hasharon (IL); Ronen Amichai, Ramat Hasharon (IL)

(73) Assignee: IoT BOX SYSTEMS LTD., Moshav Hadid (IL)

(*) Notice: Subject to any disclaimer, the term of this patent is extended or adjusted under 35 U.S.C. 154(b) by 0 days.

(21) Appl. No.: 16/010,543

(22) Filed: Jun. 18, 2018

(65) Prior Publication Data

US 2018/0301018 A1    Oct. 18, 2018

Related U.S. Application Data

(63) Continuation-in-part of application No. 14/026,409, filed on Sep. 13, 2013, now abandoned.

(60) Provisional application No. 61/700,512, filed on Sep. 13, 2012.

(51) Int. Cl.
| | |
|---|---|
| G08B 21/00 | (2006.01) |
| G08B 25/10 | (2006.01) |
| G08C 17/02 | (2006.01) |
| H04Q 9/00 | (2006.01) |
| G08B 25/08 | (2006.01) |
| G08B 21/10 | (2006.01) |

(52) U.S. Cl.
CPC ............. *G08B 25/10* (2013.01); *G08B 21/00* (2013.01); *G08B 25/08* (2013.01); *G08C 17/02* (2013.01); *H04Q 9/00* (2013.01); *G08B 21/10* (2013.01); *H04Q 2209/30* (2013.01); *H04Q 2209/40* (2013.01)

(58) Field of Classification Search
CPC .................................. G08C 17/02; H04Q 9/00
USPC ......................................................... 348/143
See application file for complete search history.

(56) References Cited

U.S. PATENT DOCUMENTS

| | | | | |
|---|---|---|---|---|
| 2006/0149509 | A1* | 7/2006 | Chyun | A01M 1/026 702/189 |
| 2009/0193707 | A1* | 8/2009 | Moran | A01M 23/16 43/58 |
| 2011/0109460 | A1* | 5/2011 | Lloyd | A01M 23/16 340/573.2 |

* cited by examiner

*Primary Examiner* — Joseph G Ustaris
*Assistant Examiner* — Amir Shahnami
(74) *Attorney, Agent, or Firm* — The IP Law Firm of Guy Levi, LLC

(57) ABSTRACT

The disclosure concerns systems and methods for wirelessly managing sensing, communicating, storing, and evaluating data gathered from a plurality of pest control devices, the system comprising: a plurality of pest checkpoints; a coordinator in wireless communication with the plurality of pest checkpoints; optionally a router in wireless communication with the session coordinator and the pest checkpoint; a web-site in communication with the session coordinator; a client interface in communication with the web-site; and a host server in communication with the web-site.

11 Claims, 4 Drawing Sheets

WIRELESS PEST MANAGEMENT SYSTEM AND METHOD

CROSS REFERENCE TO RELATED APPLICATIONS

This application is a Continuation-In-Part of Pending U.S. patent application Ser. No. 14/026,409, filed on Sep. 13, 2013, which claims priority from U.S. Provisional Patent Application Ser. No. 61/700,512, filed Sep. 13, 2012, both of which are incorporated herein by reference in their entirety.

BACKGROUND

The present disclosure relates to pest control, and more particularly, but not exclusively, relates to techniques for managing sensing, communicating, storing, and evaluating data gathered from a plurality of pest control devices.

Rodents and other small animals are common pests in industrial settings, for example, food and agriculture processing facilities. The presence of these animals in these settings can often be undesirable. For example, animals can carry disease agents, damage plant equipment, graze on product and the like. Damaging plant equipment can occur by chewing wires and the like. In certain industrial settings, for example, in the case of food processing plants, the use of pesticides may be limited. Thus, it becomes necessary to trap and remove the pests.

Rodent traps in food processing/storage facilities, pharmaceutical production facilities, and other industrial facilities need to be routinely checked—resulting in significant labor expenditures. Accordingly, there is a demand for alternative pest control device monitoring techniques.

Alternatively or additionally, the ability to gather more comprehensive data relating to pest behavior may be beneficial, therefore advancement in the area of pest control and related sensing technologies are routinely introduced. Industrial facilities typically utilize professional pest control providers to manage control of such pests. It is desirable to maintain accurate records of both pest control problems and the treatment thereof, as well as gathering pertinent data and producing meaningful reports to provide key performance indicators of the efficacy and efficiency of the pest control program in the industrial setting.

SUMMARY

Disclosed, in various embodiments, are techniques for managing sensing, communicating, storing, evaluating and reporting data gathered from a plurality of pest control devices equipped with environmental and pest-specific sensor combination, by various distributed users using wireless communication network.

In an embodiment provided herein is a system for wireless monitoring of a plurality of remote pest checkpoints, comprising: plurality of pest checkpoints, each checkpoint connected to a plurality of sensors' combination without a camera, the sensors having variable sensitivity, wherein the sensors' combination is configured to locate and identify the pests within the checkpoint; a coordinator in bi-directional wireless communication with the plurality of pest checkpoints; a router in wireless, bi-directional communication with the session coordinator; a web-site in communication with the session coordinator; a client interface in communication with the web-site; and a host server in communication with the web-site, wherein a field user is capable of configuring each of the system's plurality of check-points, sensors' sensitivity, router(s), and/or coordinator onto a wireless network via the web site.

In an embodiment, provided herein is a method, for communicating sensor data from a remote pest checkpoint to a field user comprising: operating a pest control system, the system comprising plurality of pest checkpoints, each checkpoint connected to a plurality of sensors' combination without a camera, the sensors having variable sensitivity, wherein the sensors' combination is configured to locate and identify the pests within the checkpoint; a coordinator in bi-directional wireless communication with the plurality of pest checkpoints; a router in wireless, bi-directional communication with the session coordinator; a web-site in communication with the session coordinator; a client interface in communication with the web-site; and a host server in communication with the web-site, wherein a field user is capable of configuring each of the system's plurality of check-points, sensors' sensitivity, router(s), and/or coordinator onto a wireless network via the web site; at predetermined time, via a wireless network, transmitting sensors' information from the respective sensor combination of a first one of the pest checkpoint to the session coordinator; at predetermined times or upon request, wirelessly providing the sensors information associated with the checkpoint from the session coordinator to the host server via a wireless network, wherein, upon a triggering event registered by the sensor combination, an alarm is sent by the host server to the field user, or upon a request from the field user, the host server provides a report.

In yet another embodiment, provided herein is a system for presence and location of pest in an area of interest, the system comprising: a plurality of pest checkpoints, each pest checkpoint having a plurality of sensors' combination without a camera associated with the pest checkpoint, wherein the sensors' combination is configured to locate and identify pests within the pest checkpoint; a session coordinator in bi-directional wireless communication with each of the plurality sensors associated with each pest checkpoints; a router in wireless, bi-directional communication with the session coordinator; a web-site in communication with the session coordinator; a client device in communication with the web-site; and a host server in communication with the web-site, wherein the session coordinator is configured to send an alert indicative of the presence and location of the pest to at least one of the client device, the host server and the web-site upon receiving specific measurements from the sensors' combination associated with each of the plurality of pest checkpoints.

In an embodiment, the system further comprising a central processing module in communication with the session coordinator, the wireless router, the client device, the web-site, and the host server, the central processing module having a processor therein in electronic communication with a memory containing a set of executable instruction thereof, configured, when executed, to cause the processor to: receive the alert from the session coordinator; calculate an infestation index for each pest checkpoint; and communicate the infestation index to at least one of the client device, host server, and web site These and other features of the techniques for managing sensing, communicating, storing, evaluating and reporting data gathered from a plurality of pest control devices by various distributed users, will become apparent from the following detailed description when read in conjunction with the drawings, which are exemplary, not limiting, and wherein like elements are numbered alike in several figures.

BRIEF DESCRIPTION OF THE FIGURES

For a better understanding of the techniques for managing sensing, communicating, storing, evaluating and reporting data gathered from a plurality of pest control devices by various distributed users, with regard to the embodiments thereof, reference is made to the accompanying drawings, in which like numerals designate corresponding elements or sections throughout and in which.

DESCRIPTION

Figure 1:
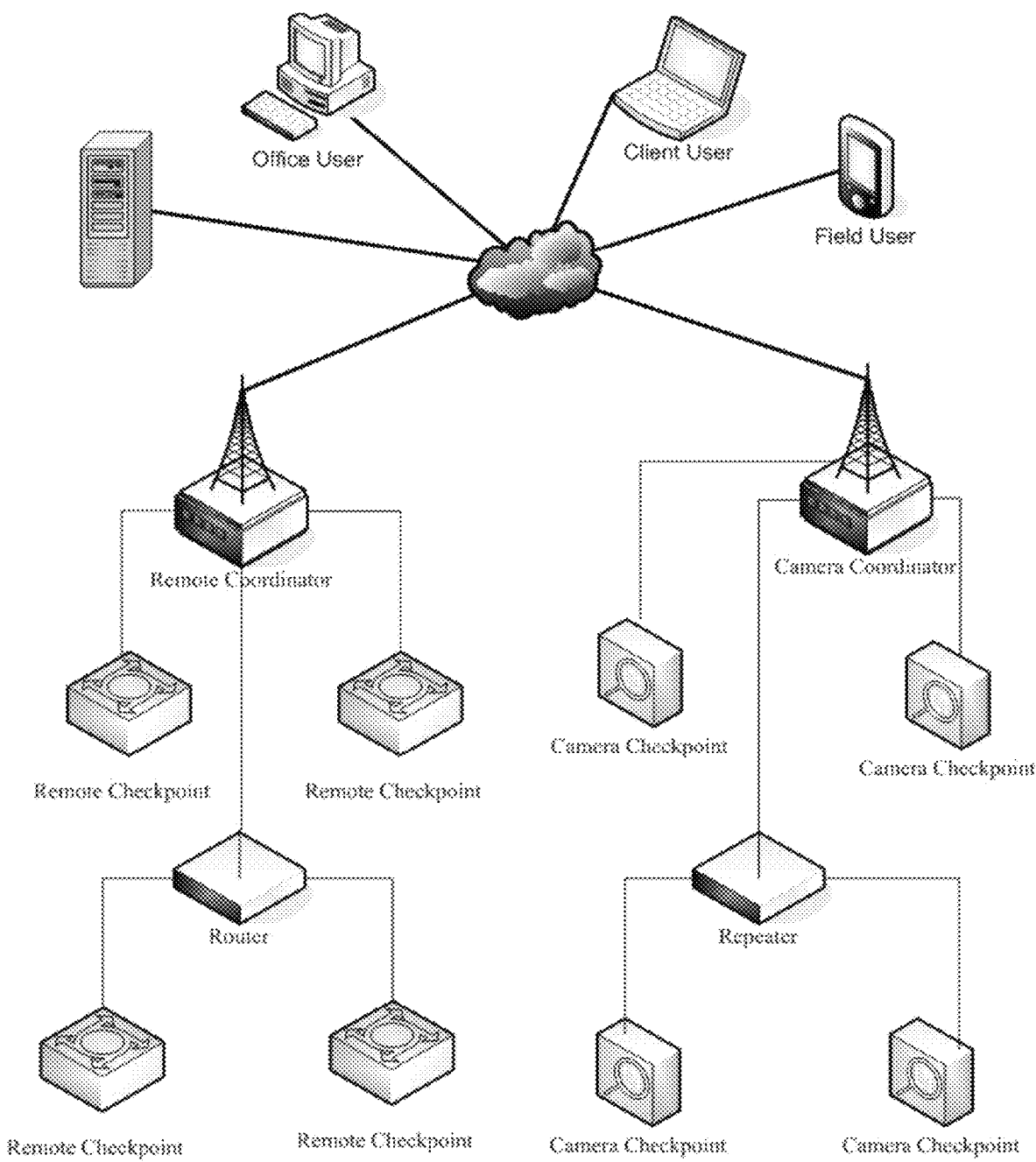
FIG. 1 shows schematic system architecture.

Provided herein are embodiments of techniques for managing sensing, communicating, storing, evaluating and reporting data gathered from a plurality of pest control devices by various distributed users.

As indicated above, since traps require constant monitoring and traps that use trap doors, and that are capable of sending an alert cannot differentiate between the various pests, nor provide information on the magnitude of any infestation due to their binary nature (tripped or not tripped), their selectivity may be high, but their specificity is quite low. There are many circumstances where the specificity of the pest checkpoint may be desired to be high as it may indicate the efficiency of mitigating treatment.

In the systems disclosed, a combination of at least two sensors, are being used to generate a single alert. The types of sensors and their combination are selected depending on the type of pest sought to be monitored (not necessarily trapped), the environment (heat, humidity, etc.) where the pest checkpoint is located and the timing of the monitoring. It is contemplated that the checkpoints will not include a camera in every case.

The system elements can comprise "Pest Checkpoint", referring to a device (for example, but not necessary traps that are used in the pest control industry) capable of transmitting a message in case a trigger is tripped, signaling that the "Pest Checkpoint" has been activated (in other words a sensor detecting the presence of a pest). Furthermore, pest checkpoint can be an area of interest in a particular structure, such as the trash cans regions in food processing plant, sewage spill outlets and the like.

The signal can be referred in the system as an "Alert" message only once certain predetermined conditions are fulfilled. In other words, because more than a single sensor is used, only once two or more sensors (a plurality of sensors) generate a count, indicating certain (user-definable) threshold parameter was exceeded, the signal of alert will be generated. Report on the pest checkpoint status using "Keep Alive" (in other words, keep monitoring), "Check" (referring to a required action from an end user) messages and "Tamper" (referring to a case when the device, or any sensor within it was misplaced). For example, the Pest Checkpoint can be operatively coupled to a fixed structure, such that accidental or intentional misplacing of the device will trigger the device to send a "Tamper" message to the host server and/or any other end-users' server. Coupling of the device can be done using for example, a wire which, when disconnected will trigger the device to send the Tamper message. Other means, such as proximity sensors, accelerometers, aligned IR sensors and the like are also contemplated. These sensors and their combination is also used in an embodiment to locate and identify the pests within the pest checkpoint.

The session coordinator (OSI-L5) can be interposed in an embodiment between the (e.g., wireless, IoT sensors and the like) sensors' network and a wide area network switch, the wide area network being the World Wide Web (Internet) or the like. In addition to being able to communicate with each of the sensors and sensors combination, wherein each sensor combination is associated with a given pest checkpoint, the session coordinator also is communicatively coupled to the wide area network using, for example, TCP/IP protocols. As may still further be used herein, the term "associated with" (e.g., the sensors' combination associated with a given pest checkpoint), includes direct and/or indirect coupling of separate items (each sensor) and/or one item (sensors' combination) being embedded within another item (e.g., pest checkpoint device).

Upon receiving a User request via the wide area network for access to one or more of the physical quantities measured by one of the sensors in the sensor network (for example, to change sensitivity of the sensor due to the type of pest sought, and/or the operating environment of the pest checkpoint), the session coordinator accesses the measured physical quantity and converts the one or more physical quantities measured by the at least one sensor to a HTML web page which, thereafter, can be posted on the host server's web site. From there the information, the physical measurement of the sensor, can be accessed by any of the distributed clients.

The "pest checkpoint" (referring to the area of interest monitored by the sensors' combination), can transmit the messages directly to the session coordinator if the distance between the session coordinator and pest checkpoint (and the sensors' combination associated with that pest checkpoint) is equal to or less than about 200 m in case using a low power transceiver (in other words, transceiver s with power equal to or less than 5 Watt) or 400 m in case of a high power transceiver, or using a "Router" if the distance between the pest checkpoint and the session coordinator is over about 200 m. The message can also be transmitted from one router to another (a process called "hop", referring to a journey whereby a data packet is sent from one router to another router in the network) until it reaches the session coordinator and thus increasing the distance between the checkpoint and the session coordinator up to 1,400 m when using the maximum of 5 routers (See FIG. 3) and low power transceiver s or 2,800 m when using high power transceiver s. Distances above are assuming line of sight between checkpoint, router and coordinator. Additionally, a hop count limit (e.g., 7 hops) can be configured into the check point to ensure the data packet does not enter into an infinite loop. The hop count limit can be configured to be the number of physical routers in the network between the pest checkpoint and the session coordinator. The session coordinator can start and control the network and store information about the network, which can include being the repository for security keys. The Router can be used in certain embodiments to extend network area coverage, dynamically route around obstacles, and provide backup routes in case of network congestion or device failure. The Routers described herein can connect to the session coordinator and other routers, and also support other devices.

Generally, whether the communication path between the pest checkpoint and the session coordinator is direct or via the router will depend on whether there is direct line of sight (LOS) between these entities. In an embodiment, the term "line of sight" is used to describe not only a spatial relationship between a pest checkpoint and a coordinator, i.e., an optical line of sight, but also a wireless communication relationship. More specifically, although a pest checkpoint may not be in an optical line of sight with a coordinator, a clear wireless communication channel may nevertheless exist between the two such that the pest checkpoint may still communicate with the session coordinator. For example, if the optical line of sight with a coordinator is blocked by low-absorption material such as field crop, the signal from the session coordinator's transceiver may still pass through the low-absorption material to communicate with the transceiver in the pest checkpoint, with the resulting data transmission from the pest checkpoint also passing back through the low-absorption material to reach the session coordinator. Accordingly, a pest checkpoint may not be in an optical line of sight communication with the session coordinator but may still be in wireless line of sight communication therewith. The wireless line of sight communication can be affected by the distance between the pest checkpoint and the session coordinator, geometric effects of the pest checkpoint (e.g., "null" points where reception is poor), and absorptive qualities of any intervening materials.

In another example, the state of being "in a line of sight" communication is defined as the ability of a pest checkpoint to have direct (e.g., single hop) bi-directional communication, regardless of whether the pest checkpoint is in a true optical line of sight with the session coordinator or not, and the state of being "not in a line of sight" communication is defined as the inability of a pest checkpoint to have direct (e.g. >1 hop) bi-directional communication with the session coordinator. Expanding on these definitions further, an entity that is in a line of sight of a coordinator may also be described as a "wirelessly-communicative" entity, and an item that is not in a line of sight of a coordinator may also be described as a "wirelessly-obscured" entity.

Accordingly and in an embodiment, the distance between each of the plurality of the pest checkpoints in the systems described herein, and the session coordinator is less than or equal to 400 m and in a direct line of sight, each of the plurality of pest checkpoints and the sensors' combination associated with each of the pest checkpoints are in direct communication with the session coordinator (and there is no router); else when the distance between the pest checkpoint and the session coordinator is more than 400 m, and/or not in line of sight (in other words, wirelessly obscured), each of the plurality of the pest checkpoints are in direct communication with the session coordinator, which is then in communication with the router; or when the distance between the pest checkpoint and the session coordinator is less than 400 m and not in line of sight, each of the plurality of the pest checkpoints are in direct communication with the session coordinator, which is then in communication with the router. In an embodiment, when there is a line of sight between the session coordinator and the plurality of pest checkpoints of no more than 200 m., and the system uses a low-power transceiver, the system does not have a router. Similarly, when there is a line of sight between the session coordinator and the plurality of pest checkpoints of less than about 400 m., and the system uses a high-power transceiver, the system does not have a router.

The system, in addition to the two or more sensors can also comprise a Camera Checkpoint, referring to a device with embedded camera (for example those used in fly traps that are used in the pest control industry). The camera checkpoint can have the ability to transmit "Image" (still picture, or in other words a single frame) at predetermined periods or upon request by the system users directly to "Camera Coordinator" if the distance between the camera coordinator and pest checkpoint comprising the embedded camera for example, is equal to or less than about 400 m, or using a "Repeater" (referring for example, to a communication device that is used as a bridge between camera checkpoint and camera coordinator, if the distance between the pest checkpoint and the session coordinator is over about 400 m.

The session coordinator, referring to a communication device that can be configured to get input data such as, inter-alia "Alerts"/"Keep Alive"/"Check"/"Tamper" messages from each of the plurality of a pest checkpoint and/or routers. The session coordinator can wirelessly transmit the messages via the internet (using for example, a cellular modem) to the host server.

The camera coordinator, referring to a communication device that can be configured to get input data such as, inter-alia; "Image"/"Check" messages from camera checkpoints and/or repeater. The camera coordinator can transmit the messages via the internet (using for example, cellular modem) to the host server.

The host server used for hosting the web application and mobile phone services for managing the system, can be configured to receive "Alerts"/"Keep Alive"/"Check"/ "Tamper" messages from coordinators, send a response back to the session coordinator, and store them in the central database. In addition, the host server can be configured to receive "Image"/"Check" messages from camera coordinators, send a response back to the camera coordinator, process the "Image" (in other words, encode the image) and store them in the central database.

Communication with the server by the session coordinators (e.g., the camera coordinator(s) and pest checkpoint coordinator(s), can be encrypted using, for example, secured socket layers (SSL) and compressed (in other words encoded) using for example GNU zip compression software (GZIP). Other compression algorithms can also be used, for example, gunzip, and/or gzcat and the like.

The host server can provide various virtual/logical components to allow sensor and pest checkpoint information from geographically disbursed coordinator(s) to be aggregated into a single database. The database can aggregate the sensor output from each sensor combination in each pest checkpoint, thus forming a reference dataset as well as a notation on the results of any visual or other verification that correlate with the sensor combination output and the presence and type of pest identified. For example, the sensors' combination associated with a given pest checkpoint can be passive IR heat sensor (PIR) and an accelerometer and the response measured and recorded and transmitted (once the user definable threshold is exceeded) can be voltage and G readings. Another sensors' combination can be a load cell and a proximity sensor and a passive IR sensor, and the response measured and recorded and transmitted (once the user definable threshold is exceeded) can be weight in grams, burst voltage, and PIR voltage measured. Other environmental sensors' combination can be configured to address specific environmental conditions or be pest specific. Accordingly, when for example, using load cells to monitor the presence of rats in an area where cockroaches are known to be prevalent, the load cell will generate an alarm once a user definable threshold is exceeded. Furthermore, the system can be configured to generate alerts if the triggering event occurs during daytime, which can be indicative of a rat infestation, thus providing additional specificity to the monitoring. Similarly, the heat signature and corresponding voltage threshold can be configured as one of the user-definable thresholds capable of being altered by the field user with the client device.

The host server can communicate, through the session coordinator, with all remote pest checkpoint groups, evaluate resulting data, and take corresponding actions using, for example, an Application Service Provider (ASP) model. Among other things, the host-server can collect the information from the various sites (such as, for example, client sites), aggregate and process this information and determine what information needs to be forwarded to a potential user, such as a field user for example. In addition, the host-server can facilitate a data archive, notification and reporting process. Selected server functional components, as defined by software or other operating logic executed by the host-server, can be, for example: (a) Firewall—provides customary data filtering, encryption, and authentication for communications over computer network; (b) Conduits—can define various application and transport communication protocols from the session coordinator and/or router or other information sources, such as UDP/IP (User Datagram Protocol), TCP/IP (Transmission Control Protocol), SMTP/IMAP/POP3 (Email Based), or Web Service; (c) Database—among other things, can store the sensor data collected in the field by the plurality of pest checkpoints. For example, communication protocol connecting the sensors used in the Pest Checkpoint and the session coordinator, in an embodiment of a remote system can be Zigbee, Bluetooth, Wi-Fi and the like.

Additional stored data types are the identifiers for the session coordinator, the pest checkpoint, the web-site, (field) user current) configuration (in other words, thresholds) and other external data feeds (e.g., environmental conditions). This data provides business intelligence back to the user (e.g., the field user) so sensors' combination data can be interpreted as it relates to other environmental information for example, air quality, temperature, relative humidity, rain amounts, location, time of day, infestation magnitude (index), etc. The mobile application can include notifications and alarm service modules that can dispatch alerts to clients from the host-server's database based on, for example, subscriptions to the database and conditions set within the database. These subscriptions can be managed, for example by subscription manager module operably coupled to the host server. For example, Microsoft SQL Server is the database engine for the host-server.

Various users can use the system. For example, an office user that can use the web application with a standard browser to manage all the activities of the system, or a field user that can install the system at the host server's client site and which can use a mobile phone to perform set up and maintenance process as well as other operations. Another, a client user—can use the web application with a standard browser to view client related data. In an embodiment, the host server is not installed at the client's site, but is rather a remote server, accessible via wireless and/or wired communication network(s).

Accordingly, provided herein is a system for wireless monitoring of a plurality of remote pest checkpoints, comprising: a plurality of pest checkpoints each checkpoint having a plurality of sensor, each sensor with a different sensitivity than the other sensors; a coordinator in wireless communication with the plurality of pest checkpoints; a router in wireless communication with the session coordinator; a web-site in communication with the session coordinator; a client interface in communication with the web-site; and a host server in communication with the web-site, wherein upon receiving a triggering event from at least two sensors, the system is configured to send an alert to at least one of the web-host or the client interface.

In another embodiment, provided herein is a system for presence and location of pest in an area of interest, the system comprising: a plurality of pest checkpoints, each pest checkpoint having a plurality of sensors' combination without a camera associated with the pest checkpoint, wherein the sensors' combination is configured to locate and identify pests within the pest checkpoint; a session coordinator in bi-directional wireless communication with each of the plurality sensors associated with each pest checkpoints; a router in wireless, bi-directional communication with the session coordinator; a web-site in communication with the session coordinator; a client device in communication with the web-site; and a host server in communication with the web-site, wherein the session coordinator is configured to send an alert indicative of the presence and location of the pest to at least one of the client device, the host server and the web-site upon receiving specific measurements from the sensors' combination associated with each of the plurality of pest checkpoints.

To start interaction with the system, a field user can have a portable electronic device capable of communicating with the host server, the device comprising an uploader configured to upload information concerning the Pest Checkpoint, which is operatively coupled to a plurality of end-user servers (e.g., client server, host server, office user server); and end-user servers in communication with the portable electronic device via a communication network. The term "uploader" refers generally to an entity that provides access to content fragments. "Content fragment" (or "fragment") refers generally to a subset of a piece of content (e.g., a part of a file containing an image, infrastructure/network information, etc.). Fragments may be generated dynamically or can be static. "Content fragment" can include, but is not limited to, individual files. In an embodiment, the systems and methods described herein are design can be designed and configured in such a manner so as to allow all the important parameters to be set by the user (e.g., the field user, for example, using a handheld wireless mobile device) in the server (e.g., the host server, and/or client server) and then updated and/or configured and/or uploaded to the devices (e.g., the Pest Checkpoint devices, traps, sensors, cameras repeaters, routers or a combination of devices comprising one or more of the foregoing).

A client interface component of the portal (in other words, the home page of the web site) accessed when initiating communication, for example between the field user's mobile device and the host server can be configured to connect to and retrieve requested data from a back-end content management server (in other words, the host server e.g., INFOWIRE server, FIG. 1). "Content" (or "digital content" or "electronic content") refers generally to any and all types or formats of data or other information stored and/or transmitted electronically. Examples of content include, but are not limited to, a piece of software, a digital image, a piece of multimedia, an electronic pamphlet or other document, and the like. In an embodiment, the retrieved data can be previous sensors' threshold values, which sensors' combination is associated with which pest checkpoint and the like.

Likewise, an end-user (e.g., office user FIG. 1) interface component can be present, with the end-user and/or user-specific data having an internal content representation that correlates to an external appearance in a plurality of content option. The end-user interface and/or user-specific data server can incorporate the requested data retrieved from the back-end content management system (in other words the host (INFOWIRE) server) into a current view in the end-users' display means. The user-specific data server can be coupled to the end-user dedicated interface (e.g., the field user's handheld device) and likewise, a user-specific data server can be coupled to another end-user dedicated interface. The end-user interface(s) can be configured to retrieve requested data incorporated into the user-specific data server and to display the requested data retrieved as one or more content items.

Further, a controller module for the end-user interface and/or user-specific data server (e.g., client server) can be coupled to each of the interface component and the end-user and/or other user-specific data server, with the controller module being configured to invoke a plurality of methods and routines to be executed by each of the interface component and the end-user interface and/or user-specific data servers in response to any user request (e.g., the field user requesting changes in sensor sensitivity, or plugging an additional Pest Checkpoint and/or camera to the network), such that the end-user interface and/or user-specific data can be transformed into a customized end-user dedicated interface that can be installed into a desired electronic device. In an embodiment, all sensors, router, repeaters, Pest Checkpoint stations (e.g., traps) are configured to be modular. In an embodiment, each of the system component has a graphical indicia, for example a QR code, that when read by, for example, the field user, will direct the user to a web site where the system's component can be easily configured in the wireless system. The configuration can be initiated as described herein, for example, by uploading a configuration site on the handheld device of the user. Likewise, some of the sensors, e.g., the components related to low level communication—for example the Pest Checkpoint can be configured to connect to the "best" router referring to the router with the strongest signal), are configured to be modular. In other words, "plug-and-play", configuration, referring to the feature of the system, whereby the various components (e.g., device objects) are interoperable and automatically detected and configured by the system (e.g., the application framework). This feature can be achieved for example by using appropriate interfaces, for example, IEEE 1394, IEEE 802, PCI, mini PCI (express), PCMCIA PC Card (express), USB or a combination comprising at least one of the foregoing.

For example, to add a Pest Checkpoint, a router or coordinator can, upon connecting via the QR code, issue a joining request. Then the joining device (e.g., the unit), after it has discovered which network to join and to which specific device on that network it should make its request, must issue a request with the rejoin flag set to for example, to FALSE. This last request can initiate a MAC protocol, whereby the joining device makes a request to join the network and the receiving device issues a response, which includes an address for the device to use while associated with that network.

The term "content management server" (e.g., the host server) or "user specific data server" (e.g., the client server), refer to a back-end hardware and software product that is used to manage content. Further, the term "dedicated interface" refers to information or content items displayed within a region of a portal web site or a specific application. For example, a dedicated interface can be a component of a portal web site and is a smaller web application that runs on a portal server. As such, a portal web site can have none, one or many such dedicated interfaces (depending on the needs of the various end-users). If a portal has more than one dedicated interface, these dedicated interfaces can connect to the same content management server (or end-user specific data server), or they can connect to different content management server (e.g., the end-user specific physical activity data server), depending on the communication network requirements. The term "end-user and/or user-specific data" or "customized end-user and/or user-specific data" is used to refer to a customized end-user and/or user-specific data that is derived, developed or created from an end-user and/or user-specific data template and which is designed to facilitate installation into a portal web site for pest management-related content in a dedicated interface. For example, an end-user interface and/or user-specific data server is required to access a given PIR-QT sensor in a specific Pest Checkpoint content data from the back-end content management server and to display contents in a dedicated interface within a portal. Further, the term "end-user interface and/or user-specific data template" or "customizable end-user interface and/or user-specific data template" is used herein to refer to the generic or customizable data template that is used to derive, create or develop a customized end-user interface and/or user-specific data server that is ready for installation into a desired portal web site when creating a new dedicated interface, for example, when installing a new sensor into the network.

Moreover, using the Pest Checkpoint interface to access a desired portal can lead an end-user to a user-specific data server. The term "desired portal" or "desired portal site" or "desired portal web site" is used to refer to a particular portal web site that can connect to a particular back-end content management server and resides on a particular portal server. In an embodiment, a commercially available portal server, such as, a portal server that is hosted by Amazon. Further, as used herein, the term "requested data" is used to refer to data requested by a user in a portal web site.

End-user dedicated interfaces can be applications that provide the proper queries to access relevant data, provide access for uploading sensor data for example, upon obtaining permission in the form of a code, accessing other user-specific data servers and the like. A portal server may aggregate content from a number of these end-user dedicated interface applications. For example, a view component of the dedicated interface used in the systems and methods described herein can further comprise a configuration page, containing a plurality of parameters that are modifiable for customizing the end-user dedicated interface for the particular end-user.

The pest checkpoint can be assembled to comprise any appropriate device that is sought to be monitored, for example, rodents bait stations, tin cat trap and the like; a communication device for example, those used in mesh network form to transmit data over longer distances, passing data through intermediate devices (e.g. router hopping) to reach more distant ones. Each device can be designed to have a single transceiver (although, under certain circumstances more than a single transceiver can be used). The transceiver can be configured to have sleep mode interval where the transceivers are turned off, that will be defined as system parameter. The device can also comprise a sensor, capable of firing trigger signal, indicating that an "event" in the device had occurred, for example a rodent in the bait station.

Each device, or pest checkpoint can have two or more sensors (e.g., a motion sensor, a heat sensor such as PIR, a proximity sensor, a load cell, a capacitor or a combination comprising at least two or more of the foregoing and the like). For example, the sensor used can be PIR+proximity sensor based on digital burst (e.g., employing low duty cycle voltage bursts of charge-transfer cycles to acquire its signal)—mode charge-transfer (e.g., QT™) sensor that is capable of detecting near proximity or touch. The QT portion of the sensor can have a dynamic range spanning many decades with noise threshold in the sub-femtofarad regime, allowing differential resolutions of mere fractions of a femtofarad, thereby providing the ability to differentiate between pests, as well as pinpoint location within the pest checkpoint itself. The threshold can be configured and altered by the user to apply to a given pest sought to be identified and located and/or other environmental conditions. Altering the differential resolution among the various sensors increase in an embodiment the specificity and selectivity of the system.

When used in reference to the "specificity and selectivity of the system" the term "sensitivity" refers to the probability that the sensors combination configuration in the pest checkpoint network disclosed herein gives a positive result when the alert is positive, for example, a triggered event was indeed the result of the presence of a rat during daytime. Sensitivity is calculated as the number of true positive results divided by the sum of the true positives and false negatives. Sensitivity essentially is a measure of how well the system disclosed herein correctly identifies the intended pest sought to be monitored. Likewise, the term "specificity" means the probability that the sensors combination configuration in the pest checkpoint network disclosed herein gives a negative result when the sample is not positive, for example, not generating a triggered event (see e.g., table 2 hereinbelow). Specificity can be calculated as the number of true negative results divided by the sum of the true negatives and false positives. Specificity essentially is a measure of how well the sensors combination configuration in the pest checkpoint network disclosed herein excludes non-qualifying triggering events.

Likewise, the device can have a user interface, comprising a button (or icon in circumstances where the interface is a touch screen and the like) used to generate a "check" message referring to a system diagnostic tool for initiating diagnosing and testing communication between the pest checkpoint and the host server; an indicator light (e.g. LED light) for communication and/or in case the sensor is activated. The device can have more than a single indicator light with different colors indicating different functions. For example, blue light indicating full communication with the host server will turn yellow when communication is lost and a green light will turn red when a sensor trigger is tripped. The interface can also have an on/off switch, which can be used for activating/deactivating the device.

After a designated time period has passed during sleep mode, a wake-up is triggered. For example, a sleep timer is programmed as a system parameter to wake-up the pest checkpoint every 100 milliseconds (10 times per second), and the operating logic, as defined at least in part by firmware, is divided into time-based tasks, some of which are executed every wakeup period (100 milliseconds) and others that are executed every predetermined number of wakeups (e.g., every tenth, $100^{th}$ etc.). Similar configurations can be made for other system components with sleep mode.

Each pest checkpoint can have its own unique identifier based on the transceiver's medium access control (MAC) address (referred to as checkpoint MAC, which is responsible for providing reliable communications between a node (such as the session coordinator, or each of the sensor or, in other words—a Pest Checkpoint) and its immediate neighbors, helping to avoid collisions and improve efficiency. The MAC Layer can also responsible for assembling and decomposing data packets and frames). The checkpoint MAC will be displayed on the each of the plurality of pest checkpoints, using, for example, a sticker as text and/or a 2D barcode (e.g., QR code standard). The barcode can also contain a flag to indicate that this barcode is related to each of the plurality of pest checkpoints and direct a user to the web site. A quick response (QR) code refers to machine readable indicia in the form of a two-dimensional bar code. Users with a camera phone configured with the correct reader software may scan the image of the QR Code causing the phone's browser to launch and redirect to the programmed URL. Furthermore, each sensor can have its own MAC address, allowing for direct programming by the various distributed user once access is authorized.

When a sensor trigger in a device is tripped (in other words, when the environment-specific and/or pest-specific, user-definable threshold is exceeded), each of the plurality of pest checkpoint comprising that sensor, can be configured to acquire information from the event: For example, sensor type, where each sensor-type can have a number. For example, 1—PIR; 2—Capacitor type A; 3—load cell and other sensors that might be installed in the pest checkpoint with their unique identifying number. The sensor can also send a value the event numeric value. For example, hard coded value of "1" for PIR sensor, voltage level for capacitor sensor, weight for a load cell and the like for each of the sensors in the pest checkpoint. Each event can be configured to provide a time stamp for the trigger tripping.

Each of the plurality of pest checkpoints can be configured to manage data for each sensor type and sensors' combination in the device. In an embodiment, each checkpoint has a "sensing time frame" that is defined according to the environment where the checkpoint is placed (e.g., indoor, outdoor, dry, or humid) or behavior of the pest targeted by the checkpoint (e.g., nocturnal animal, light sensitivity). During this "sensing time frame" each sensor and/or sensor combination, can be configured to report, for example, the following parameters:

a. Counter—the number of times the sensor was triggered;
b. Max value—The maximum value of the sensor. This is defined in an embodiment by the sensor type. For example in case of a PIR it is voltage, in touch sensors this can be the velocity, and on a load cell the max value can be weight.
c. Max Value Time Stamp—The timestamp when the Max. Value was recorded. Furthermore this parameter defines the "sensing time frame".
d. Min. Value—again, sensor-specific minimal value;
e. Min Value Time Stamp—The timestamp when the Min. Value was recorded. Furthermore this parameter also defines the "sensing time frame". In an embodiment, the sensing time frame can be pest specific.

As illustrated in Tables 1, and 2 below, the system can be configured to determine that "Alert" (the presence of a predetermined pest) occurred within the particular checkpoint, when during the "sensing time frame" both sensors (in other words, the unique sensor combination for the subject pest checkpoint) have counter (in other words, a registered triggering event) bigger then 0.

For example in table 1 the alert will be generated and communicated to the use while in Table 2 (because of sensor 2) the alert will not generated.

TABLE 1

Data acquisition from the device - Alert Generated

| Sensor type | Counter | Max Value | Max Value Time stamp | Min Value | Min Value Time stamp |
|---|---|---|---|---|---|
| 1 | 23 | 2.76 | 2010-02-02 12:45:19 | 0.11 | 2010-02-02 12:40:10 |
| 2 | 300 | 120 | 2010-02-02 12:42:00 | 3 | 2010-02-02 12:44:02 |
| 1 | 23 | 2.76 | 2010-02-02 12:45:19 | 0.11 | 2010-02-02 12:40:10 |
| 2 | 0 | 0 | | 0 | |

Assuming for example that the sensor is a PIR sensor; the value in Counter (23) refers to the number of times the sensor was triggered, where the value noted in Max Value (2.76) refers to the maximum voltage recorded in the 23 times the sensor was triggered. Likewise, the value in Min Value (0.11) is the minimum voltage recorded in the 23 times the sensor was triggered. Accordingly, the value in "Max Value Time stamp", (2010-02-02 12:45:19) refers to the maximum time stamp recorded in the 23 times the sensor was triggered—the last event. Finally, the value in "Min Value Time stamp" column (2010-02-02 12:42:00) refers to the minimum time stamp recorded in the 23 times the sensor was triggered—the first event Given the above we can assume that: Counter>0, Max Value Time stamp>=Min Value Time stamp (can be equal only if Counter=1), and Max Value>=Min Value The alert can also be configured to generate a "magnitude" referring in an embodiment to an estimate of an infestation level associated with the pest checkpoint. The Alert "magnitude" or "infestation index" is calculated using the following basic formula:

$$\sum_{2}^{n} \frac{\text{Max Value} - \text{Min. Value}}{|\text{Max Value Time Stamp} - \text{Min Value Time Stamp}|} \quad \text{Equ. 1}$$

wherein—n is the number of sensors used for the checkpoint.

For example, using the alert generated based on the measurements obtained from Table 1 herein (Table 2 will show no magnitude, since no alert was generated), the infestation magnitude is:

[(2.76−0.11)/|(12:45:19−12:45:10)|]+[(120−3)/|(12:45:10−12:45:12)|]=[2.65/9]+[117/|−2|]=58.8 (the "infestation index")

Accordingly and in an embodiment, the system further comprising a central processing module in communication with the session coordinator, the wireless router, the client device, the web-site, and the host server, the central processing module having a processor therein in electronic communication with a memory containing a set of executable instruction thereof, configured, when executed, to cause the processor to: receive the alert from the session coordinator; calculate an infestation index for each pest checkpoint; and communicate the infestation index to at least one of the client device, host server, and web site.

The term "module" is used herein to refer to software computer program code and/or any hardware or circuitry utilized to provide the functionality attributed to the module. Further, the term "module" or "component" can also refer to software objects or routines that execute on the computing system.

When the transceiver is woken up from sleep mode it can transmit all the alerts to the session coordinator or router. The alert message can contain the summarized values as described in Table 1 or 2 above with the pest checkpoint, or MAC for identification of at least one of each sensor in the sensors' combination associated with the pest checkpoint and the pest checkpoint itself. Upon successful transmission of the data, the alerts can be deleted from each of the plurality of pest checkpoints.

Power supply for each of the plurality of pest checkpoint can be based on, for example batteries that should preferably last for at least half a year, more preferably, at least a year.

At predetermined times that can be defined as system parameter, each of the plurality of pest checkpoints and routers can be configured to initiate a "Keep Alive" transmission to the session coordinator and/or router, which can include a number that indicates the batteries strength, a number that indicates the Radio Signal Strength Indication (RSSI), number of Reset Cycles, a hard coded value that indicates the software version installed in the unit (Checkpoint Version (CPV)), a numeric value of failed Checkpoint-to-coordinator and Coordinator-to-Checkpoint transmission attempts (Fails), a time stamp, and checkpoint MAC or a combination thereof. As response to the generated "Keep Alive" message, each of the plurality of pest checkpoints can be configured acquire from the session coordinator various system parameters. For example; a disable flag, disabling the pest checkpoint to stop transmitting the messages "Alert" and "Keep Alive", the pest checkpoint sleep mode interval, the pest checkpoint "Keep Alive" transmission time interval, or a combination thereof and other system parameters.

Figure 3A:
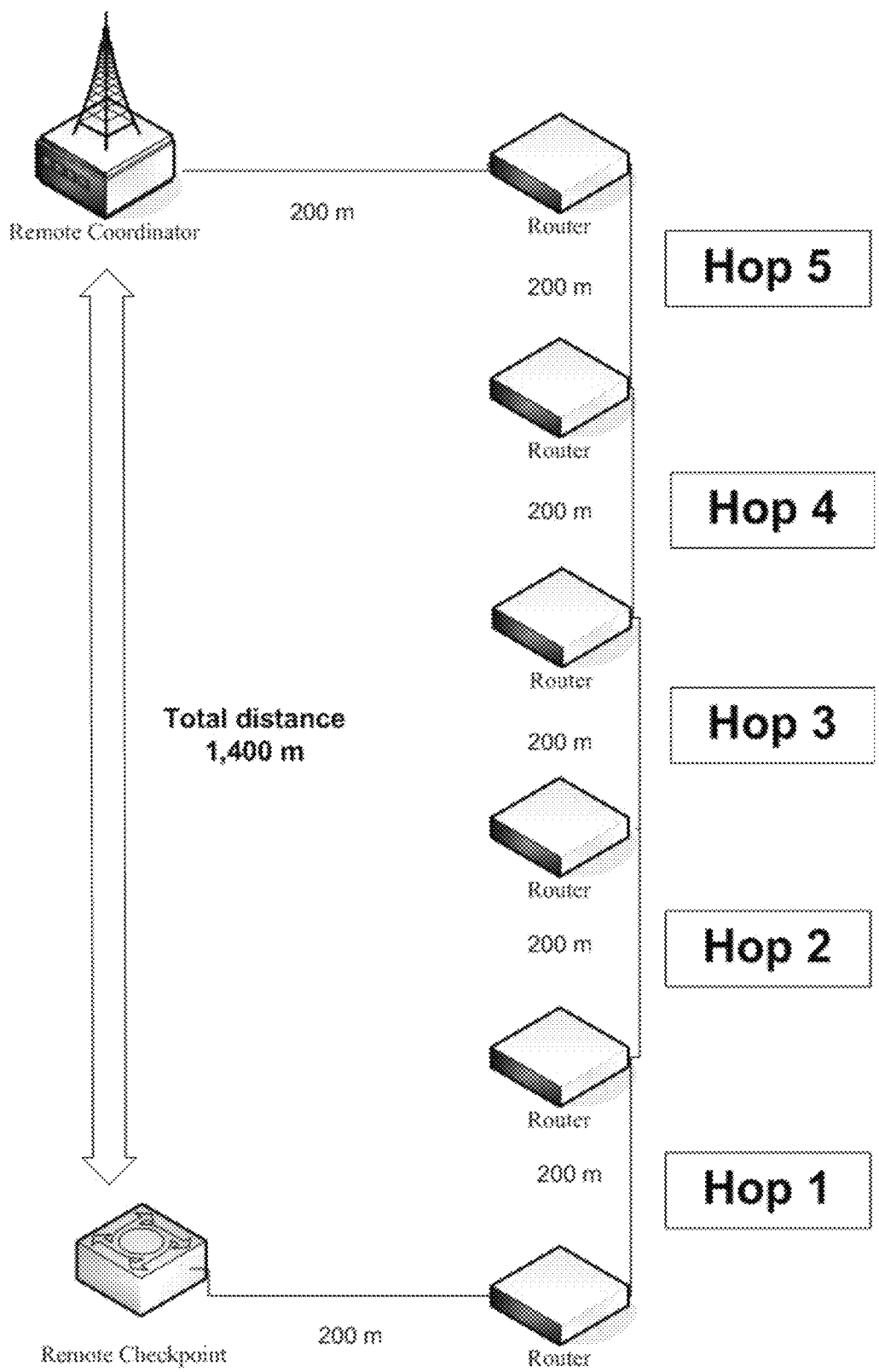
FIGS. 3A and 3B shows an illustration of "hopping" of a message between systems components with varying environmental constraints, allowing longer (3A) distance among routers to the session coordinator; and shorter (3B) distance.
Figure 3B:
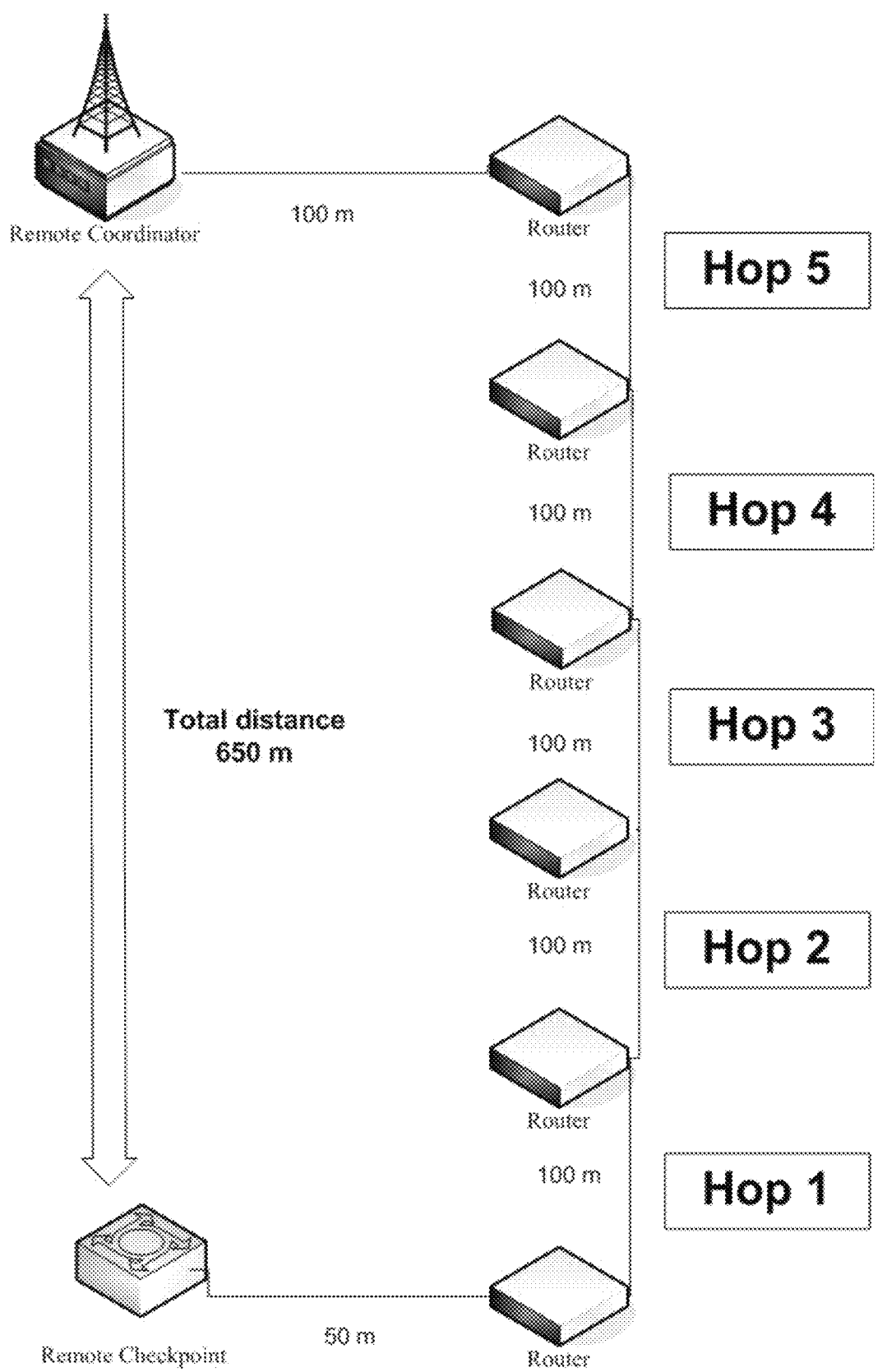

When the button on the user interface of the device is pressed, each of the plurality of pest checkpoint or router(s) can be configured initiate a "Check" message to the session coordinator and/or router with the same data and response as "Keep Alive" data. The system can also be configured to support a distance equal to or less than, for example, 200 meter without routers and a distance equal to or less than 1400 m (1.4 Km) between each of the plurality of pest checkpoint and the session coordinator when using routers that make use of "Hopping" as illustrated in FIGS. 3A and/or 3B. The "Router" is a communication device that can pass the "Alerts"/"Keep Alive"/"Check"/"Tamper" messages from a predefined list of the plurality of pest checkpoint (identified by their checkpoint MAC) that are connected to it, to the session coordinator. The "Router" can also generate "Router Check" and "Router Keep Alive" to indicate to the server on its condition. The router can be built with a transceiver, and a user interface such as the user interface described above. Each router has its own unique identifier based on the Transceiver MAC Address (will be referred as "Router MAC"). The router MAC can be displayed on the router using a sticker as text and as a 2D barcode (using QR code standard). The barcode can be configured also to contain a flag, to indicate that this barcode is related to that specific router. The power supply of the router can be a wall mountable power supply with a fixed connection to the electricity network, or using an external pack of batteries that should be sufficient for at least 2 months. In another example, a solar panel can be used to power the Pest Checkpoint and the rest of the system. In an embodiment, the QR code can be used to configure a new router onto the network when necessary.

The session coordinator can receive "Alerts" and/or "Keep Alive" and/or "Check" and/or "Tamper" messages from a predefined list routers and/or each of the plurality of pest checkpoints (identified e.g., by their checkpoint MAC and/or router MAC) The session coordinator can also receive messages "Router Keep Alive" and/or "Router Check" generated by router. The session coordinator can comprise, for example, a transceiver that receives "Alerts" and/or "Keep Alive" and/or "Check" messages from routers and/or each of the plurality of pest checkpoints (depending on whether the distance between the pest checkpoint and the session coordinator is above the router threshold); and in case of "Keep Alive" and/or "Check" and/or "Router Keep Alive" and/or "Router Check" message can be configured transmit back data to the each of the plurality of pest checkpoints and/or routers. The session coordinator can further comprise a cellular modem (in other words, a mobile broadband modem), for example a standard GPRS (core network) modem, which can be operated with SIM card (or UICC) that can connect to the Internet. Likewise, the session coordinator can further comprise a user interface as described above.

The system may further comprise a wireless network interface, to communicate with a wireless communication network; and a modem capable of interfacing with a wireless WAN network. For example, the modem can use General Packet Radio Service (GPRS) through the Global System for Mobile communications (GSM) protocol. It should be appreciated that in alternative embodiments, the network interface, and/or the modem may vary. For example, the session coordinator can directly interfaces with the internet.

The session coordinator can comprise includes a memory module. The session coordinator can be an electronic circuit comprised of one or more components, including digital circuitry, analog circuitry, or both. The session coordinator may be a software and/or firmware programmable type; a hardwired, dedicated state machine; or a combination of these. For example, the session coordinator can be a programmable microcontroller solid-state integrated circuit that integrally includes a processing unit and memory. The memory module can be comprised of one or more components and can be of any volatile or nonvolatile type, including the solid state variety, the optical media variety, the magnetic variety, a combination of these, or such different arrangement as would occur to those skilled in the art. Further, more than one processing unit can be included. When multiple processing units are present, coordinator can be arranged to distribute processing among such units, and/or to provide for parallel or pipelined processing if desired. Coordinator functions in accordance with operating logic defined by software and/or firmware programming, hardware, or a combination of these. In one form, memory stores program instructions that are executed by one or more processing units of coordinator to embody at least a portion of this operating logic. Alternatively or additionally, memory stores data that is manipulated by the operating logic of coordinator. Coordinator can include signal conditioners, signal format converters (such as analog-to-digital and digital-to-analog converters), limiters, clamps, filters, dedicated timers, and the like as needed to perform various operations described in the present application. Indeed, in one form, coordinator, wireless communication circuitry and power management circuitry are at least partially defined by the same integrated circuit device.

A person skilled in the art would readily recognize that the modem used in the devices and methods provided, will depend, inter-alia, on the mobile broadband networks available at the location (e.g. CDMA, WiMax and the like). For example, LTE or LTE advanced can be used in location where 4G networks are supported.

Each coordinator has can have its own unique identifier based on the transceiver MAC Address (will be referred as "Coordinator MAC"). The session coordinator MAC can be displayed on the each of the plurality of pest checkpoint using a sticker as text and as a 2D barcode (using e.g., QR code standard). The barcode can also be configured to contain a flag to indicate that this barcode is related to that specific coordinator. The power supply of the session coordinator can be based on an internal high reliability device with fixed connection to the electricity network.

When the session coordinator receives "Alerts" and/or "Keep Alive" and/or "Router Keep Alive" messages it can be configured store them in a storage module in the session coordinator. The session coordinator can be configured be able to store at least 1000 messages, or at least 10,000 message. At a predefined interval defined as a system parameter, the session coordinator can be configured connect to the Internet, communicate with a predefined (hard coded) server domain name (in other words, the host server) and then using a proprietary XML-based protocol, send the "Alerts" and/or "Keep Alive" and/or "Router Keep Alive" messages data to the host server. Upon successful transmission, the "Alerts" and/or "Keep Alive" and/or "Router Keep Alive" messages can be configured to be deleted from the session coordinator.

Likewise, when the session coordinator receives "Check" and/or "Router Check" and/or "Tamper" message from the router and/or the plurality of pest checkpoints, it can be configured send the "Check" and/or "Router Check" and/or "Tamper" message immediately to the host server. In the case of "Keep Alive" and "Check" and/or "Router Check" and/or "Tamper" messages, the session coordinator can be configured to store the response(s) from the host server and pass them to the each of the plurality of pest checkpoints in the next communication session. All the communication with the host server can be configured use standard compression (e.g., GZIP) and encryption (e.g., SSL). The software of the session coordinator can be automatically updated using a link in the server where the new software is located.

The host server can have a domain name and it can be configured to always be connected to the Internet. Likewise, the host server can be configured expose a "Listener" that receives "Alerts" and/or "Keep Alive" and/or "Check" and/or "Router Check" and/or "Tamper" and/or "Router Keep Alive" and/or "Coordinator Keep Alive" messages on a specific port in a proprietary XML protocol. The ports can be different for received "Alerts" and/or "Keep Alive" and/or "Check" "and/or "Router Check" and/or "Tamper" and/or "Router Keep Alive" and/or "Coordinator Keep Alive" messages, depending on the encryption protocol used, as well as for outgoing inquiries and command initiated by the field user or client. The data can be configured be stored in the central database. In addition, the server can be configured to host the web application used by any of the various users (e.g. "Office User" and/or "Client User" and the mobile services used by "Field User"), of the pest control and management systems and methods described herein. Moreover, the server can be configured to hold the latest version numbers for each of the plurality of pest checkpoint and coordinator and standard hyperlinks links for downloading it.

System communications may be of a routine, periodically scheduled type, or of an event/condition-driven type. Additionally, user or administrator initiated queries or updates may be delivered to plurality of pest checkpoints. For Example, "downlink" communications from host-server to web site utilize User Datagram Protocol (UDP), and "uplink" communications from web site to host-server, utilize File Transfer Protocol (FTP). Further, this non-limiting implementation provides operating logic for the web site as a collection of software tasks written, for example, in C++ under the Microsoft Windows multithreading environment provided by Windows and the .NET Framework. A description of several exemplary tasks for this implementation are described as follows: (a) "Check": This task initializes communications peripherals including the network interface and the modem to establish links to the wireless networks. In an embodiment, an Check message is provided to web site upon successful completion of a Pest checkpoint invocating a Check request, which may occur when an installer activates the install mode with switch un the physical user interface of the pest checkpoint, or after a pest checkpoint successfully self-heals (in other words, reestablishes connection with for example, the router and/or the session coordinator) a connection path to web site. The Check message can contain information about the pest checkpoint's identity, function (the pest checkpoint sensor type), and communications path, including (optionally multiple) quality-of-service (QoS) metrics.

Web site checks the pest checkpoint identification (pest checkpoint MAC) against a locally (in other words, one the web site or the database of the session coordinator, or a database in the host-server) stored list of currently installed plurality of pest checkpoints. If the ID of the pest checkpoint can be new, the information, including communications path, can be stored by the web site, and the newly added pest checkpoint can be added to the polling list of pest checkpoints that should be polled. If the ID of the pest checkpoint is already in the database, only the updated path information is stored. In an embodiment the web site can query for unsolicited event messages from the plurality of pest checkpoints of a given coordinator, which can be generated to indicate conditions, such as, for example: Sensor Active, Low Battery, Sensor Fault, etc. Upon receipt of such an event message, the web site can attach a local time stamp and forward the event to the host-server over the GRPS connection using FTP for example. Also, the web site can implement a task to periodically poll each of the plurality of pest checkpoints in an ordered manner (in other words, self-initialized diagnostic step). Upon expiration of a configurable POLL TIMER, the web site can generate a POLL REQUEST for the next pest checkpoint in succession from a listing of the installed plurality of pest checkpoints and awaits a response. The resulting response message from the polled pest checkpoint can include information such as sensor status, battery status, temperature, and condition, which is stored to a local database file and periodically sent to host-server using FTP.

The system can be accessed bay various types of users. An "Office user" can use the web application hosted on the host server with a standard browser. The office user can login to a customized "Company view" and define (among other parameters) different entitles, for example: the company clients (Clients), and each of the clients' one or more web sites. In addition, on the Site level, various system parameters can be defined. These include, for example, each of the plurality of pest checkpoints' location, checkpoint MAC, sleep time interval, each of the plurality of pest checkpoints' "Keep Alive" transmission time interval, the session coordinator transmission time interval, or a combination thereof. Additionally the office user as defined herein, can view and manage "Alerts" and/or "Keep Alive" messages retrieved from the central database, as well as disable each of the plurality of pest checkpoints by setting it status to "Disable".

Another entity capable of interfacing with the systems and methods described herein, is a "Client User". "Client user" can likewise use the web application hosted on host server with a standard browser. The client user can login to the "Client view" and view data related to client or to the clients in its group (in optional circumstances where the client is defined as "Master" of the group).

Yet another entity capable of interfacing with the systems and methods described herein, is a "Field user". "Field user" can interface with the system using, for example, a mobile phone application that communicates with host server mobile services. The mobile application can be configured to scan 2D barcodes (e.g., QR code reader) placed on coordinators and/or routers and pest checkpoints as described herein. Using the mobile phone application, the "Field user" can further define further entitles. These entities can be, for example; coordinators, each of the plurality of pest checkpoints, and routers. Moreover, the field user can retrieve "Check" messages generated by each of the plurality of pest checkpoint on the mobile application.

The office user as defined herein, creates the "Client" and its "Sites" as described herein. For each client site, the system can be configured to assign default values for various parameters. These parameters include, for example; each of the plurality of pest checkpoints' sleep time interval, each of the plurality of pest checkpoint's "Keep Alive" transmission time interval, coordinator transmission time interval, or a combination of parameters including at least one of the foregoing.

Likewise, the office user as defined herein, can modify the default values to make them more suitable to the specific needs of the site. Upon installing the system described herein, the "Field user" can arrive at the client's industrial site with all the equipment. Using the mobile phone application various activities can be performed. These activities can be, for example; locating the "Client" and the "Site", adding a coordinator that can be configured to open the 2D barcode scanner portion of the application. The field user as described herein, can scan the barcode on the session coordinator to get the session coordinator MAC address. The session coordinator MAC can also be typed in case the barcode is corrupted. The field can also add more information to the information transferred from the session coordinator to the host server database, like, for example, notes and location information (using the mobile phone GPS).

The field user as described herein, by saving the data can send the data to the host server and create a coordinator record in the central database, thereafter, scan the 2D barcodes of all the routers and each of the plurality of pest checkpoints of the site. The 2D barcode can contain a flag that indicate the type of the device. In case the barcode is corrupted the field user as described herein, can type the MAC value and define if the device is a routers or each of the plurality of pest checkpoints. Likewise, the field user as described herein, can add more information to the data received from each of the plurality of pest checkpoint and/or router, like, for example, notes and area information (selecting area type from a predefined list of areas like "Storage room", "Door", etc.').

Figure 2:
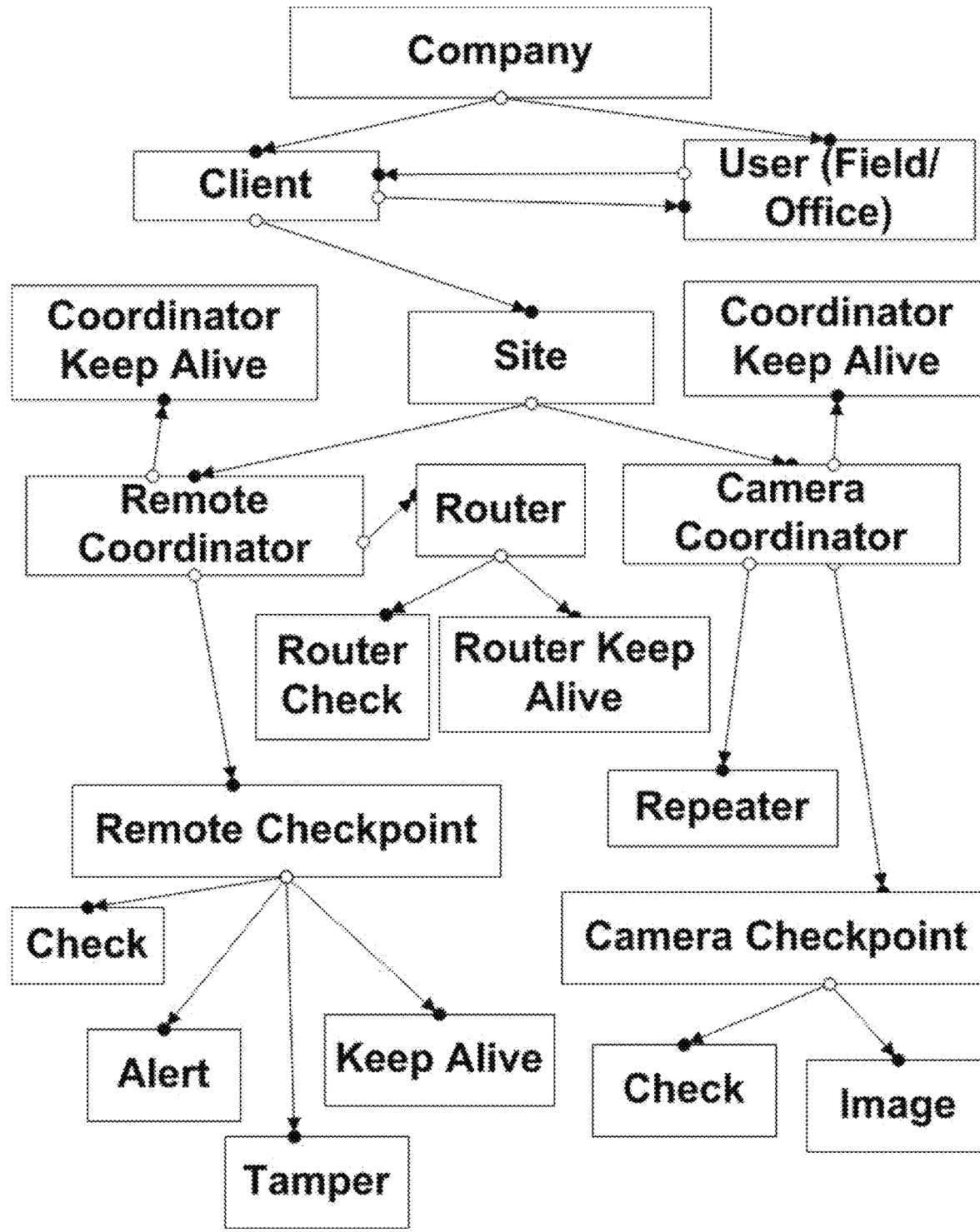
FIG. 2 shows entity relation diagram.

Which each of the plurality of pest checkpoints is connected to which router, may remain unknown to the field user. The system design can assume that such relation is not necessary (see also FIG. 2) because the router can actually be connected to all the pest checkpoints of the specific coordinator.

When installing the system, the field user as described herein, can place the session coordinator and plug it to the electricity grid. The placement and use of routers as described herein can be done based on the site configuration, such that routers may be used even for circumstances where the distance between the pest checkpoint and the session coordinator is less than 400 m, for examples, when the distances between the session coordinator and the pest checkpoint is between 10 m and 400 m or between 10 m and 300 m, specifically, between 10 m and 200 m, or between 10 m and 100 m, more specifically, under 100 m distance. The distance between repeaters and camera coordinators in camera checkpoints can be similarly (in other words, identical manner), be varied.

The system can be configured to start with various actions. These actions include, for example; connecting the session coordinator to the internet using the GPRS modem (or any appropriate cellular modem) and with the hard coded values of server domain name and port can be configured communicate with host server. During this stage the LED can be configured to indicate that the session coordinator is trying to connect (when finished, the session coordinator can be configured display that it is "Ready" using the LED). Likewise, the session coordinator can be configured send it's coordinator MAC to the server and acquire, as response, data that can be stored in the internal database of the system. The data stored in the host server's database can be, for example, a list of MAC address of each of the plurality of pest checkpoints and routers (e.g., with no relationship between them), coordinator transmission time interval, or a combination thereof.

The field user as described herein, can also place the routers and plug them to the electricity network or use a battery case for temporary installation or use solar panel in case the router is placed outdoor. The user can then press the button that can be configured generate various steps or actions. These steps or actions can, for example be try to connect with the session coordinator (during this step the led can be configured to blink 5 times a second). Upon successful connection, the led blink rate can be configured to blink once a second. Also, when the field user as described herein, press the button the "Router Check" message with router MAC can be transmitted to the host server.

When installing the system, the field user can place each of the plurality of pest checkpoints and perform various step including for example, turning the On/Off switch to "On"—initializing the checkpoint and during this period the led can be configured to display a steady light. Following initialization, each of the plurality of pest checkpoint can then try to connect to router or coordinator. If successful then the led can be configured to blink for one minute then it can be configured turn off (to save batteries). Also, when the field user as described herein, press the button the "Check" message with checkpoint MAC can be transmitted to the host server. As a response (from the host server), the session coordinator can be configured to return various parameters that can be configured be stored and used by the plurality of pest checkpoint. These parameters include, for example, pest checkpoint sleep time interval, pest checkpoint "Keep Alive" transmission time interval, a disable flag, or a combination of parameters comprising at least one of the foregoing. The disable flag can have no actual meaning and it is returned just for keeping a standard protocol for "Check" message.

The field user as described herein, can view "Check" messages using the mobile phone application to confirm that communication. The installation process can be done any time the field user as described herein, would like to confirm that each of the plurality of pest checkpoints has connection to the system. In addition, the program may be further configured to execute commands directed at initiating communication between the field user and the Pest Checkpoint over a communication network configured to upload infrastructure information (e.g., number and location of various Pest Checkpoints, Cameras, Routers and Repeaters) concerning the system; and initiating communication between the user and end-user/client(s) server(s). In initiating communication, the command can execute direct transmission and reception of signals without connecting through any base stations or servers by, for example, wireless signal transmission means such as electric waves or through cables.

The portal servers for the various end users can process requests for page content in two phases, an "action" phase and a "render" phase, in that order. In the action phase, all invoked dedicated interfaces on the page can be configured to process the request, but do not necessarily generate content. For particular requests it may be that the action phase is omitted, or may be invoked on a subset of the dedicated interfaces (in other words, sub-menus) or on a single dedicated interface. In the render phase, the invoked dedicated interface(s) contribute its (their) respective chunks of, for example, specific Pest Checkpoint content to a portal engine that generates a page in response to the original request on the end-users' display means. This generated page is then sent to the requesting browser for rendering.

A more complete understanding of the components, processes, and devices disclosed herein can be obtained by reference to the accompanying drawings. These figures (also referred to herein as "FIG.") are merely schematic representations based on convenience and the ease of demonstrating the presently disclosed devices, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Turning now to FIG. 1, showing the system's components. As shown in FIG. 1, system coordinators (e.g., camera and sensors) are in data communication with, for example, a wireless network, which has the host server (INFOWIRE) in communication therewith, as well as the various clients and users. The term "client" and formatives thereof as utilized herein refer to any party desiring to initiate interaction with an information/support service accessible by the methods and systems described herein and likewise is meant to include any individual, party, entity, or combination thereof that queries base level data and derived information from the systems and methods described, and may be used interchangeably with "user," or "end-user".

As shown (see e.g., FIG. 3A, 3B), depending on the power supply parameters and the distance between the pest checkpoint and/or the camera, (resulting, for example from environmental constraints associated with "line-of-sight"), the devices can be operably coupled directly to the session coordinator(s), or to a router/repeater. Although a single router/repeater is shown, FIG. 1 intends to encompass those circumstances where more than a single router is disposed between the pest checkpoint and the session coordinator, whereby information or data flows bi-directionally via discrete number of limited router hops (see e.g., FIG. 3A, 3B). It should be noted, that communication throughout the network is bi-directional. The term "bi-directional" as used herein means in an embodiment, that data paths and communication can flow in either direction between two endpoint systems, servers, devices and/or a combination thereof. It should be noted though that the term "bi-directional" does not exclude a unidirectional channel communication. Furthermore, The term "communication" and its derivatives (e.g., "in communication") may refer to a shared bus configured to allow (bi-directional) communication between two or more devices, or to a point to point (bi-directional) communication link configured to allow communication between only two points or devices.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The term "plurality", as used herein, is defined as two or as more than two. The term "another", as used herein, is defined as at least a second or more. The terms "including" and/or "having", as used herein, are defined as comprising (i.e., open language). In addition, the term "system" shall also be taken to include any collection of systems or sub-systems that individually or jointly execute a set, or multiple sets, of instructions to perform one or more functions. Also, the term "system" refers to a logical assembly arrangement of multiple devices, and is not restricted to an arrangement wherein all of the component devices are in the same housing.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

We claim:

1. A system for monitoring presence and location of pest in an area of interest, the system comprising:
   a. a plurality of pest checkpoints, each pest checkpoint having a plurality of sensors' combination without a camera associated with the pest checkpoint, wherein the sensors' combination is at least two of: an infrared sensor (PIR), a load cell, an accelerometer, a proximity sensor, a motion sensor, and a capacitor, the sensor combination further being specific for at least one of: environment, and pest, and configured to locate and identify pests within the pest checkpoint;
   b. a session coordinator in bi-directional wireless communication with each of the plurality sensors associated with each pest checkpoints;
   c. optionally a router in wireless, bi-directional communication with the session coordinator;
   d. a web-site in communication with the session coordinator;
   e. a client device in communication with the web-site, configured to alter each of the plurality of sensors in the sensors' combination;
   f. a host server in communication with the web-site; and
   g. comprising a central processing module in communication with the session coordinator, optionally the wireless router, the client device, the web-site, and the host server, the central processing module having at least one processor in electronic communication with a memory storing a set of executable instructions, configured, when executed, to cause the at least one processor to:
      i. receive the alert from the session coordinator;
      ii. calculate an infestation index for each pest checkpoint; and
      iii. communicate the infestation index to at least one of the client device, host server, and web site,
   wherein, when all the sensors associated with the pest checkpoint sensors' combination exceed a threshold, the session coordinator is configured to generate and send an alert indicative of the presence and location of the pest to at least one of the client device, the host server and the web-site upon receiving specific measurements from the sensors' combination associated with each of the plurality of pest checkpoints at a predetermined time frame.

2. The system of claim 1, wherein each of the plurality of sensors in the sensors' combination associated with each of the plurality of pest checkpoints is configured to register an event only once the predetermined threshold is exceeded.

3. The system of claim 1, wherein for each alert, the session coordinator is configured to transmit a count, a maximum value of the sensor-specific measured response, a time stamp corresponding to the maximum value, a minimum value of the sensor-specific measured response, and a time stamp corresponding to the minimum value.

4. The system of claim 1, wherein the infestation index is proportional to at least one of the count, the maximum value of the sensor-specific measured response, the time stamp corresponding to the maximum value, the minimum value of the sensor-specific measured response, and the time stamp corresponding to the minimum value.

5. The system of claim 1, wherein the infestation index is represented by the Equation:

$$\sum_{2}^{n} \frac{\text{Max Value} - \text{Min. Value}}{|\text{Max Value Time Stamp} - \text{Min Value Time Stamp}|}$$

Where n—is the total number of sensors associated with the pest checkpoint.

6. The system of claim 2, wherein the at least two sensors are the passive infrared sensor and the proximity sensor.

7. The system of claim 2, wherein the at least two sensors are the passive infrared sensor and the load cell.

8. The system of claim 2, wherein the pest is a nocturnal pest and the sensors' combination associated with the pest checkpoint is configured to send an alert only at hours associated with activity of the nocturnal pest.

9. The system of claim 1, wherein there is a line of sight between the session coordinator and the plurality of pest checkpoints, wherein the system does not have a router.

10. The system of claim 9, wherein the line of sight is no more than 200 meters and the system further comprises a low-power transceiver.

11. The system of claim 9, wherein the line of sight is no more than 400 meters and the system further comprises a high-power transceiver.

* * * * *